(12) United States Patent
Gardner et al.

(10) Patent No.: US 7,042,367 B2
(45) Date of Patent: May 9, 2006

(54) VERY HIGH DATA RATE TELEMETRY SYSTEM FOR USE IN A WELLBORE

(75) Inventors: Wallace R. Gardner, Houston, TX (US); Roger L. Schultz, Aubrey, TX (US)

(73) Assignee: Halliburton Energy Services, Carrollton, TX (US)

( * ) Notice: Subject to any disclaimer, the term of this patent is extended or adjusted under 35 U.S.C. 154(b) by 821 days.

(21) Appl. No.: 10/067,126

(22) Filed: Feb. 4, 2002

(65) Prior Publication Data

US 2002/0140572 A1 Oct. 3, 2002

(51) Int. Cl.
*G01V 1/00* (2006.01)

(52) U.S. Cl. .................... 340/853.3; 375/222
(58) Field of Classification Search ............ 340/853.3, 340/855.5; 375/222, 258, 356
See application file for complete search history.

(56) References Cited

U.S. PATENT DOCUMENTS

| | | | |
|---|---|---|---|
| 3,922,496 A * | 11/1975 | Gabbard et al. ............ 370/324 |
| 4,589,285 A | 5/1986 | Savit | |
| 5,253,219 A | 10/1993 | Houston et al. | |
| 5,253,271 A | 10/1993 | Montgomery | |
| 5,331,318 A | 7/1994 | Montgomery | |
| 5,838,727 A | 11/1998 | Lyon et al. | |
| 5,933,454 A | 8/1999 | Cioffi | |
| 5,986,749 A | 11/1999 | Wu et al. | |
| 6,580,751 B1 * | 6/2003 | Gardner et al. ............. 375/222 |

FOREIGN PATENT DOCUMENTS

| | | |
|---|---|---|
| WO | WO 98/52312 | 11/1998 |
| WO | WO 9933215 | 7/1999 |
| WO | WO 00/29717 | 5/2000 |
| WO | WO 01/49001 A1 | 7/2001 |
| WO | WO 02/077413 A1 | 10/2002 |

OTHER PUBLICATIONS

Search Report for PCT Application No.: PCT/US01/09917.
1999 IEEE International Solid-State Circuits Conference Digest of Technical Paters 1st ed., pp. 248-249.
International Preliminary Examination Report for PCT Application No.: PCT/US01/09917.

* cited by examiner

*Primary Examiner*—Timothy Edwards, Jr.
(74) *Attorney, Agent, or Firm*—Konneker & Smith, P.C.

(57) ABSTRACT

A very high data rate telemetry system is provided for use in a wellbore. In a described embodiment, a telemetry system includes multiple nodes positioned in the wellbore and distributed over a substantial length of the wellbore. The nodes simultaneously communicate with a remote location at a very high combined data transmission rate. A method of communicating data in a wellbore is also provided. The method includes the steps of installing multiple modems in the wellbore, installing a remote modem at a location remote from the downhole modems, and simultaneously communicating data from each of the downhole modems to the remote location. Each downhole modem communicates with the remote modem using a unique set of frequency subchannels.

49 Claims, 14 Drawing Sheets

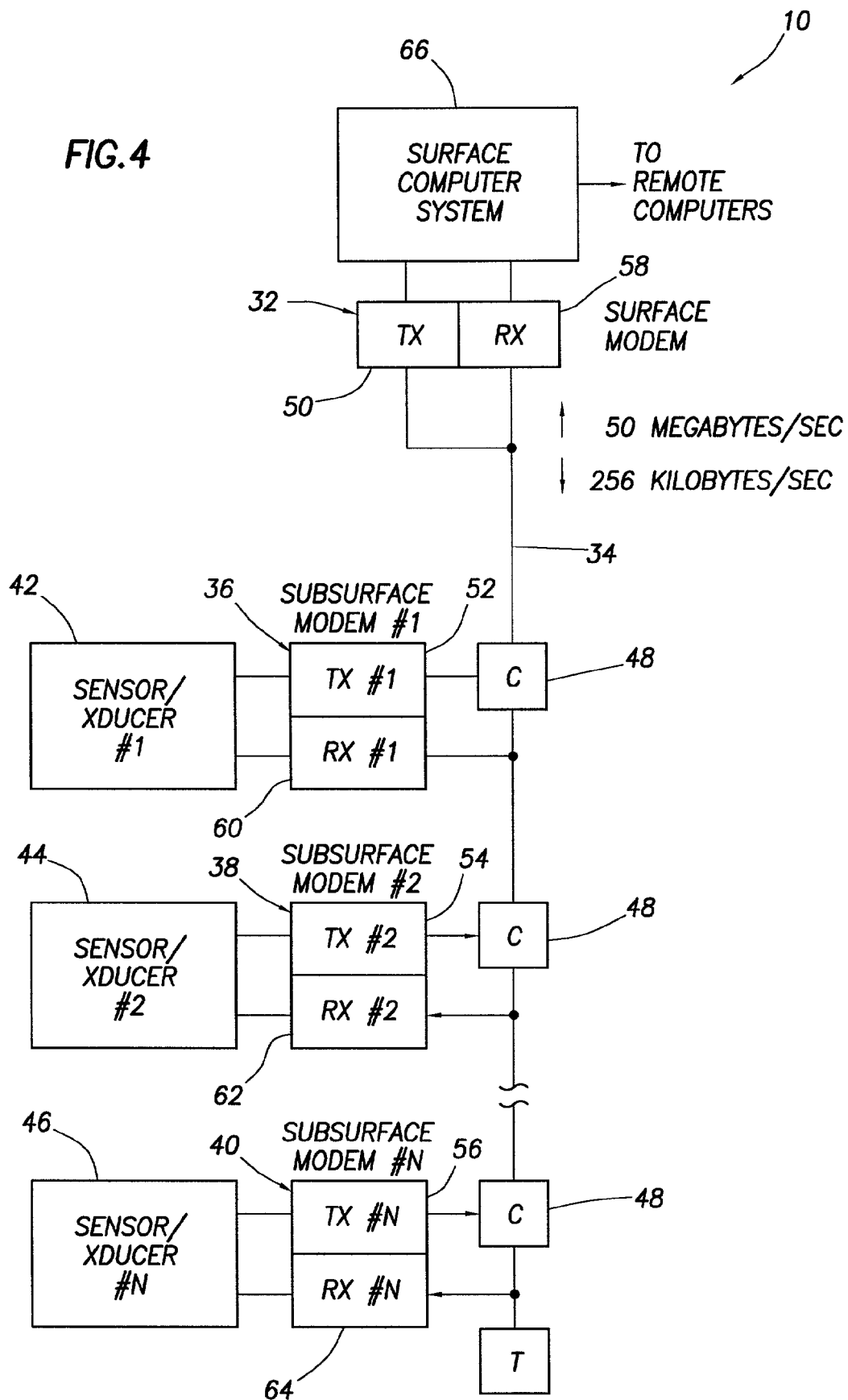

VERY HIGH DATA RATE TELEMETRY SYSTEM FOR USE IN A WELLBORE

CROSS-REFERENCE TO RELATED APPLICATION

This application claims the benefit of the filing date under 35 USC §119 of PCT Application No. PCT/US01/09917, filed Mar. 27, 2001, the disclosure of which is incorporated herein by this reference.

TECHNICAL FIELD

The present invention relates generally to telemetry systems utilized in conjunction with operations in a wellbore and, in an embodiment described herein, more particularly provides such a telemetry system having a very high data rate capability.

BACKGROUND

A need exists for communicating data in a wellbore at rates far exceeding the capabilities of current wellbore telemetry systems. As one example, it would be very desirable to permanently install a large number of geophones in a wellbore and transmit data from the geophones simultaneously to a remote location, such as the earth's surface.

In this example, a telemetry data rate of about 30 Mbps might be required. Unfortunately, conventional wireline logging telemetry systems are capable of only about 300 kbps, which is two orders of magnitude less than the desired data rate.

Furthermore, conventional wireline logging telemetry systems are not designed to transmit data from widely distributed data sources. Instead, the data sources used with wireline logging tools are typically closely arranged in a well. Transmission of data from widely distributed data sources, on the other hand, can cause delays in relative transmission times between the respective data sources, thereby altering the relationships between the transmitted data.

In the case of seismic data, it is important for evaluation of the data that the data from separate sensors measured at a particular time be transmitted in a manner which permits this time relationship to be preserved. One manner of furthering this goal is to transmit the data from separate sources simultaneously via the same transmission channel. However, transmission of data from separate sources via the same transmission channel presents other challenges, such as how to differentiate one source's data from another source's data.

One type of telemetry system used in other applications is known as DMT VDSL (Discreet Multi-Tone Very-high-data-rate Digital Subscriber Line). The DMT VDSL system includes modems developed for high speed point-to-point communication over a telephone local subscriber loop. These modems are being commercialized currently for high speed internet connections.

However, DMT VDSL modems are suitable for communication only between two discreet endpoints. They are not capable of communicating data simultaneously between multiple widely distributed nodes and a remote location.

SUMMARY

In carrying out the principles of the present invention, in accordance with an embodiment thereof, a system and method are provided which solve the above problem in the art.

In one aspect of the invention, a telemetry system is provided for use in a wellbore. The telemetry system includes multiple nodes positioned in the wellbore and distributed over a substantial length of the wellbore. The nodes communicate simultaneously with a remote location via a single transmission channel at a combined data transmission rate of greater than 300 kbps.

Each of the nodes includes a transmitter which transmits data to the remote location using a unique set of frequency subchannels. Each of the transmitters may include a data framer, a cyclic redundancy check generator, a data scrambler, a Reed-Solomon encoder, a data interleaver, a QAM constellation encoder and a cyclic prefix adder.

The data framer inserts data in a superframe only in portions of the superframe corresponding to the set of subchannels used by the respective node transmitter. The cyclic redundancy check generator attaches a byte only to the portion of the superframe corresponding to the set of subchannels used by the respective node transmitter. The data scrambler scrambles data only in the portion of the superframe corresponding to the set of subchannels used by the respective node transmitter. The Reed-Solomon encoder adds forward error correction bits only to the portion of the superframe corresponding to the set of subchannels used by the respective node transmitter. The data interleaver interleaves data only in the portion of the superframe corresponding to the set of subchannels used by the respective node transmitter. The QAM constellation encoder encodes data only in the portion of the superframe corresponding to the set of subchannels used by the respective node transmitter. Only one of the cyclic prefix adders adds a cyclic prefix to the superframe generated by the respective transmitter.

A receiver is positioned at the remote location for receiving data transmitted from each node in its respective superframe. The receiver may include a de-interleaver, a Reed-Solomon decoder, a descrambler and a cyclic redundancy checker.

The de-interleaver separately de-interleaves data transmitted from each of the nodes in the portion of the corresponding superframe associated with the respective node. The decoder separately detects and corrects bit errors identified by forward error correction bits from each of the nodes in the portion of the corresponding superframe associated with the respective node. The descrambler separately descrambles data from each of the nodes in the portion of the corresponding superframe associated with the respective node. The cyclic redundancy checker separately checks data from each of the nodes in the portion of the corresponding superframe associated with the respective node.

Each node has a unique address for transmissions from the remote location to the separate nodes. The addresses may be established after the nodes are positioned in the wellbore.

In another aspect of the invention, a method of communicating data in a wellbore is provided. The method includes the steps of installing multiple downhole modems in the wellbore, installing a remote modem at a location remote from the downhole modems, and simultaneously communicating data from each of the downhole modems to the remote location. Each downhole modem communicates with the remote modem using at least one frequency subchannel separate from frequency subchannels used by the other downhole modems.

A training and initialization method is provided which includes an activation and acknowledgement phase, a transceiver training phase, a channel analysis phase and an information exchange phase. Frequency subchannels are assigned to the respective downhole modems so that the subchannels assigned to each downhole modem have a combined bit rate capacity which is greater than or equal to a bit rate requirement for the respective downhole modem.

These and other features, advantages, benefits and objects of the present invention will become apparent to one of ordinary skill in the art upon careful consideration of the detailed description of a representative embodiment of the invention hereinbelow and the accompanying drawings.

BRIEF DESCRIPTION OF THE DRAWINGS

FIG. 4 is a schematic block diagram of the MPP VDSL telemetry system of the present invention;

DETAILED DESCRIPTION

Representatively illustrated and described herein is a very high data rate telemetry system 10 which embodies principles of the present invention. In the following description of the telemetry system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The telemetry system 10 uses elements of a prior art DMT VDSL telemetry system, but includes several novel features which enable the use of the new telemetry system in a wellbore where multiple data source nodes communicate with a remote location. The new telemetry system 10 is referred to herein as an MPP VDSL (Multi-Point to Point VDSL) telemetry system to distinguish it from the prior DMT VDSL telemetry system, which only permits communication between two discreet endpoints. Since DMT VDSL is a single-point to single-point technology, it is not suitable for the multi-point to point communications required for permanent sensor installations in wellbores.

Figure 1:
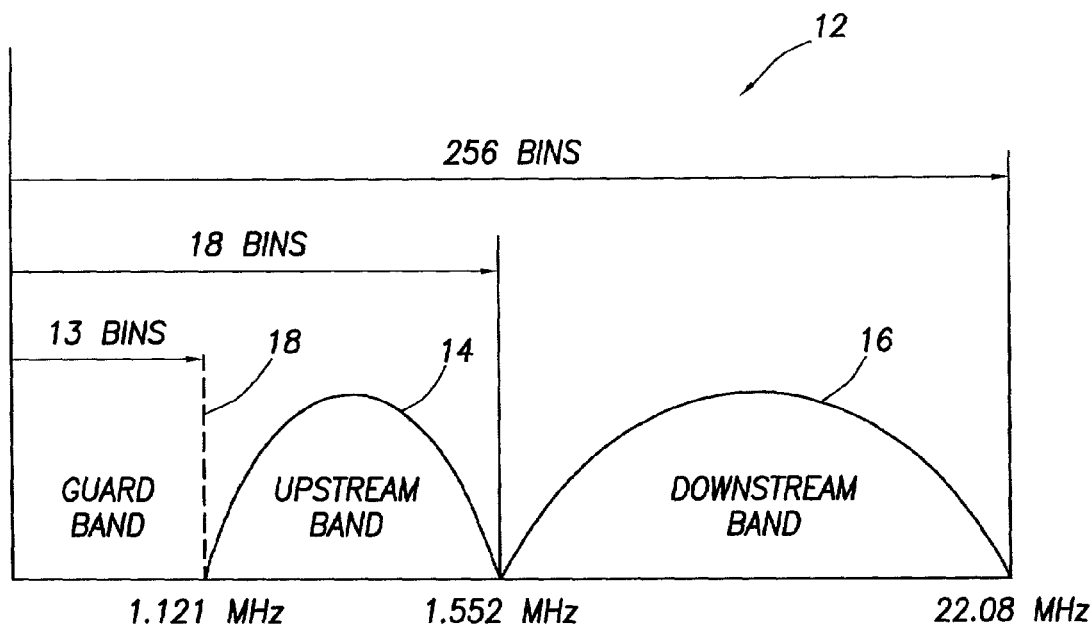
FIG. 1 is a graph of frequency bands in a prior art DMT VDSL telemetry system.

Referring now to FIG. 1, a graph 12 of frequency bands in a DMT VDSL system is illustrated. Uplink (or upstream) and downlink (or downstream) frequency bands 14, 16 are shown on the graph 12. Note that DMT VDSL divides a typical usable transmission bandwidth of approximately 21 MHz into 243 equally spaced subchannels (or bins), each approximately 86.25 kHz wide.

Thirteen bins are typically reserved for a guard band 18 in order to avoid interference with adjacent ADSL transmission channels. Thus, approximately 1.1 MHz is usually the starting point for DMT VDSL transmissions.

Note that the uplink band 14 includes only 5 bins, while the downlink band 16 includes 238 bins. This situation is dictated by the fact that most DMT VDSL consumers download data from a network at a far greater rate than they upload data to the network. However, in a wellbore application where multiple data source nodes in the wellbore communicate with a remote location, data will be transmitted at a far greater rate from the nodes to the remote location (in an upstream or uplink direction) than will be transmitted from the remote location to the nodes (in a downstream or downlink direction).

Figure 2:
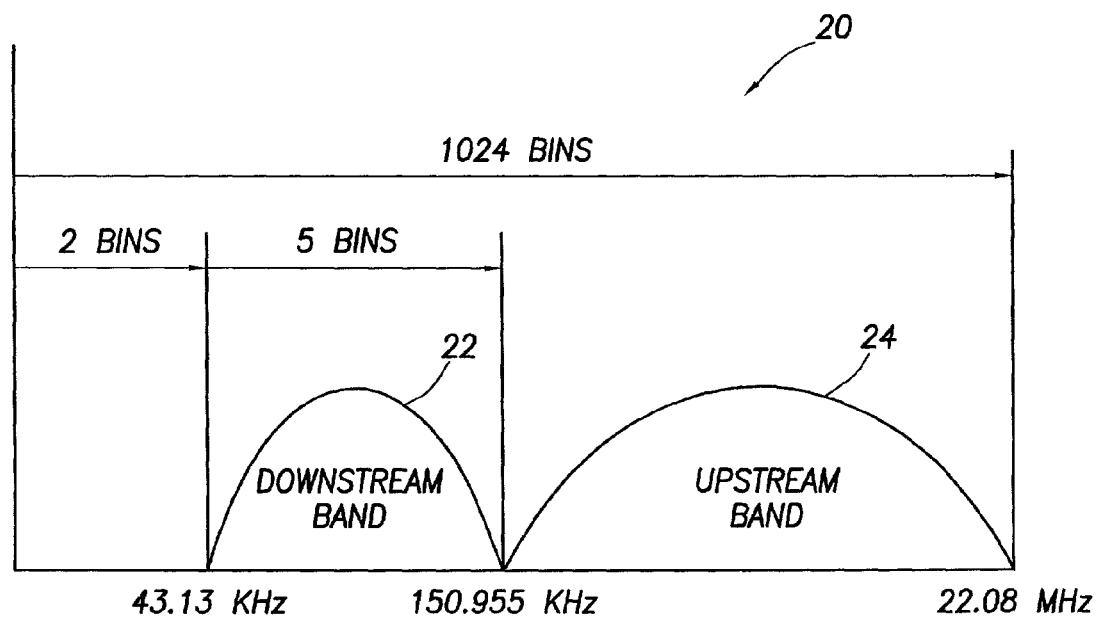
FIG. 2 is a graph of frequency bands in an MPP VDSL telemetry system embodying principles of the present invention.

Referring additionally now to FIG. 2, a graph 20 of frequency bands in the MPP VDSL system 10 of the present invention is representatively illustrated. Due to there being no adjacent ADSL channels, the lower bound on the transmission range can be reduced, allowing a higher data rate to be achieved than in prior DMT VDSL systems.

For the example depicted in FIG. 2, the total transmission frequency bands extend from approximately 43.13 kHz to approximately 22.08 MHz. This is divided up into 1022 bins, each approximately 21.565 kHz wide. Note that a greater number of subchannels or bins are available for transmission in the MPP VDSL telemetry system 10 than in the prior DMT VDSL system (1017 vs. 243).

A downstream frequency band 22 extends from approximately 43.13 kHz to approximately 150.955 kHz, encompassing 5 bins. An upstream frequency band 24 extends from approximately 150.955 kHz to approximately 22.08 MHz, encompassing 1017 bins. This permits a far greater total data rate transmission in the upstream direction than in the downstream direction.

A sampling frequency of 44.16 MHz is used in the MPP VDSL telemetry system 10. This sampling frequency is twice the maximum frequency (22.08 MHz) in the upstream band 24.

Figure 3A:
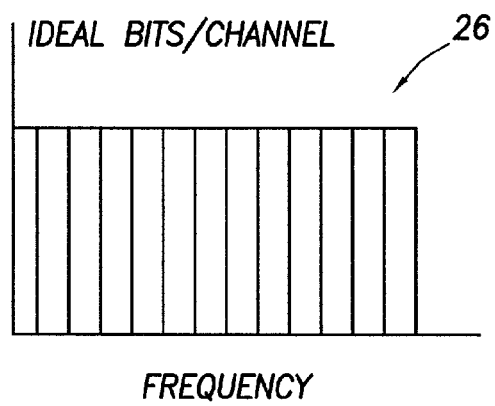
FIGS. 3A–C are graphs of bit rate distribution vs. frequency in VDSL telemetry systems.
Figure 3B:
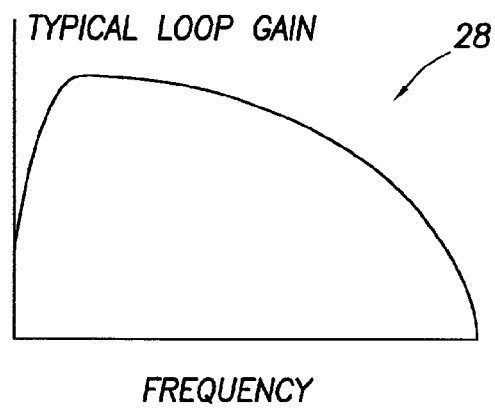
Figure 3C:
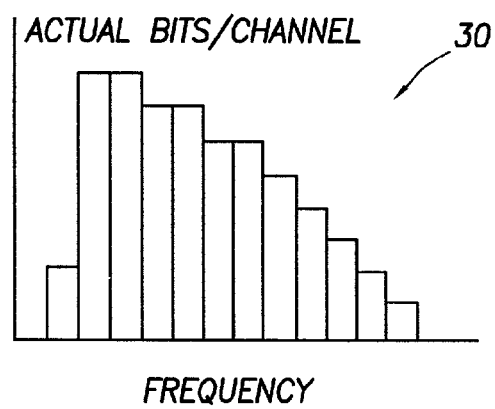

Referring additionally now to FIGS. 3A–C, graphs 26, 28, 30 are illustrated of bit rate distribution vs. frequency in a typical DMT VDSL telemetry system. When DMT VDSL devices are activated, each of the subchannels is tested by the end devices for attenuation and noise in a complex handshaking procedure. Usually, each of the numerous subchannels employs its own coding technique based on QAM (Quadrature Amplitude Modulation), well known to those skilled in the art. Some of the subchannels will carry more data than others, depending on the signal-to-noise ratio of the particular subchannels.

All of the subchannels are constantly monitored for performance and errors. The speed of an individual subchannel or group of subchannels can vary depending on operational and environmental conditions. If a subchannel is corrupted by noise, it will be adjusted to carry less data than a quiet subchannel.

As shown in FIG. 3A, all subchannels will carry the same bit rate in an ideal situation. An ideal situation would be, for example, a very short, continuous, straight run of 24 gauge copper wire, without any outside noise. Of course, this situation is very rarely experienced in actual practice.

FIG. 3B shows typical gain (the reciprocal of attenuation) in a typical actual situation. At very low frequencies, interference and noise limit gain. At higher frequencies, distance effects dominate and gain gradually drops off.

As shown in FIG. 3C, DMT VDSL devices measure the gain in each subchannel and adjust the actual number of bits per second transmitted on each subchannel, to reflect the actual gain profile (i.e., as shown in FIG. 3B). Note that real gain profiles may be very different from that shown in FIG. 3B, due, for example, to the effects of a bridged tap, which acts like a long delay circuit as a signal travels out and back, with the returning signal interfering with the main signal (i.e., a standing wave). Another example is interference due to other transmission sources, such as nearby radio stations, etc.

Referring additionally now to FIG. 4, the MPP VDSL telemetry system 10 is representatively illustrated. The telemetry system 10 is depicted in a configuration for a particular use in a wellbore. However, it is to be clearly understood that many other configurations may be used, without departing from the principles of the present invention.

While standard DMT VDSL is a point to point technology, MPP VDSL is a multipoint to point technology. In the new system 10, a single modem 32 at one end of a transmission line 34 communicates with multiple modems 36, 38, 40 distributed along the transmission line. For the example of permanent sensor installations in wellbores, the multiple downhole modems 36, 38, 40 associated with respective downhole sensors 42, 44, 46 communicate simultaneously over the transmission line 34 with the single modem 32 positioned at a remote location, such as the earth's surface.

The surface modem 32 is connected to a data acquisition/display/storage/analysis system 66, shown in FIG. 4 as a surface computer system. However, it is to be understood that any type of data acquisition or display or storage or analysis system may be used, and the system may be otherwise positioned, in keeping with the principles of the present invention. In particular, the computer system 66 may be positioned at another remote location, separate from the surface modem 32, etc.

The transmission line 34 is preferably a coaxial cable, but it may alternatively be a single twisted pair line, or any other type of suitable line. The sensors 42, 44, 46 are preferably geophones in the illustrated example, but they may be other types of sensors or transducers, or other types of data sources, or any combination or these, without departing from the principles of the present invention. Any number of the sensors 42, 44, 46 and associated modems 36, 38, 40 may be used in the telemetry system 10. In addition, multiple sensors or other data sources may be associated with each downhole modem 36, 38, 40.

A sensor or other data source (42, 44, 46) and its associated modem (36, 38, 40) is referred to herein as a node, or more specifically, as a sensor node or data source node. Each modem 32, 36, 38, 40 includes a respective transmitter 50, 52, 54, 56 and a respective receiver 58, 60, 62, 64. A directional coupler 48 is used to couple each downhole transmitter 52, 54, 56 to the transmission line 34, so that the transmitters do not load each other down. The couplers 48 are designed to provide uniform characteristic impedance from the nearest to the farthest of the downhole modems 36, 38, 40.

In the telemetry system 10, the 1017 available subchannels (see FIG. 2) are subdivided and assigned in groups to the multiple modems 42, 44, 46 connected to the transmission line 34. For example, if there are 200 modems, an average of about five subchannels may be assigned to each modem. Each modem only transmits data in the particular subchannels assigned to it.

The subchannel assignments are preferably made after the installed system is powered up and the capacity of each individual subchannel has been analyzed during an initialization procedure. As described above in relation to FIGS. 3A–C, some subchannels may have a reduced bit rate capacity as compared to other subchannels. Any subchannels determined to be corrupted by noise are either not assigned to a sensor node, or would have their data transmission rate reduced.

Subchannel assignments are made such that the sum of the data capacities of the subchannels assigned to each sensor node exceed the data transmission requirements of the sensor node. Subchannel assignments are made such that a sensor node will not be assigned a large excess capacity, in order not to greatly reduce the data efficiency of the entire transmission system.

Any set of subchannels that satisfy the data requirements for a particular sensor node can be assigned to that sensor node. It is not necessary to assign contiguous frequency subchannels to a sensor node, since each node transmitter is capable of transmitting any set of subchannel frequencies over the entire approximately 151 kHz to 22 MHz upstream frequency band 24.

It is desirable to limit the number of sensor nodes connected to a single transmission line, so that several of the subchannels can be assigned to each sensor node. Having a larger average number of subchannels assigned to each node allows for subchannel assignment flexibility. This makes it easier to achieve near optimal data transmission efficiency.

Where the data transmission requirements for each of the nodes is the same, such as in the present example where each node includes a similar geophone sensor, the number of subchannels assigned to each node will still vary. This is due to the fact that the data transmission capacities of the individual subchannels vary, and so more subchannels may be assigned to one node than another, even though the total data transmission capacities of the respective assigned groups of subchannels is similar.

All of the separate downhole modems 36, 38, 40 communicate simultaneously with the same single surface modem 32. Since the transmissions from the downhole modems 36, 38, 40 are on different frequencies, the data from the downhole modems will not interfere with each other in the frequency domain. However, data superframes transmitted from the individual downhole modems 36, 38, 40 should be synchronized, in order that the single surface modem 32 can recover the data.

In DMT VDSL, this is not a problem, because only a single transmitter transmits to a single receiver at a time on all of the subchannels. In MPP VDSL, not only are different transmitters used simultaneously, they may also be widely distributed, so that each transmitter has a different time delay for the data sent from the transmitter to arrive at the receiver. For this reason, the MPP VDSL telemetry system 10 includes a special synchronization procedure performed during initialization, which ensures that the data from all of the downhole modems arrives at the surface modem 32 synchronously. This procedure involves calculating a round trip transmission delay between the surface modem 32 and each downhole modem 36, 38, 40, and then using this information to individually delay a clock in each modem that is phase-locked to a tone broadcast from the surface modem. The synchronization method is described in more detail below.

Figure 5:
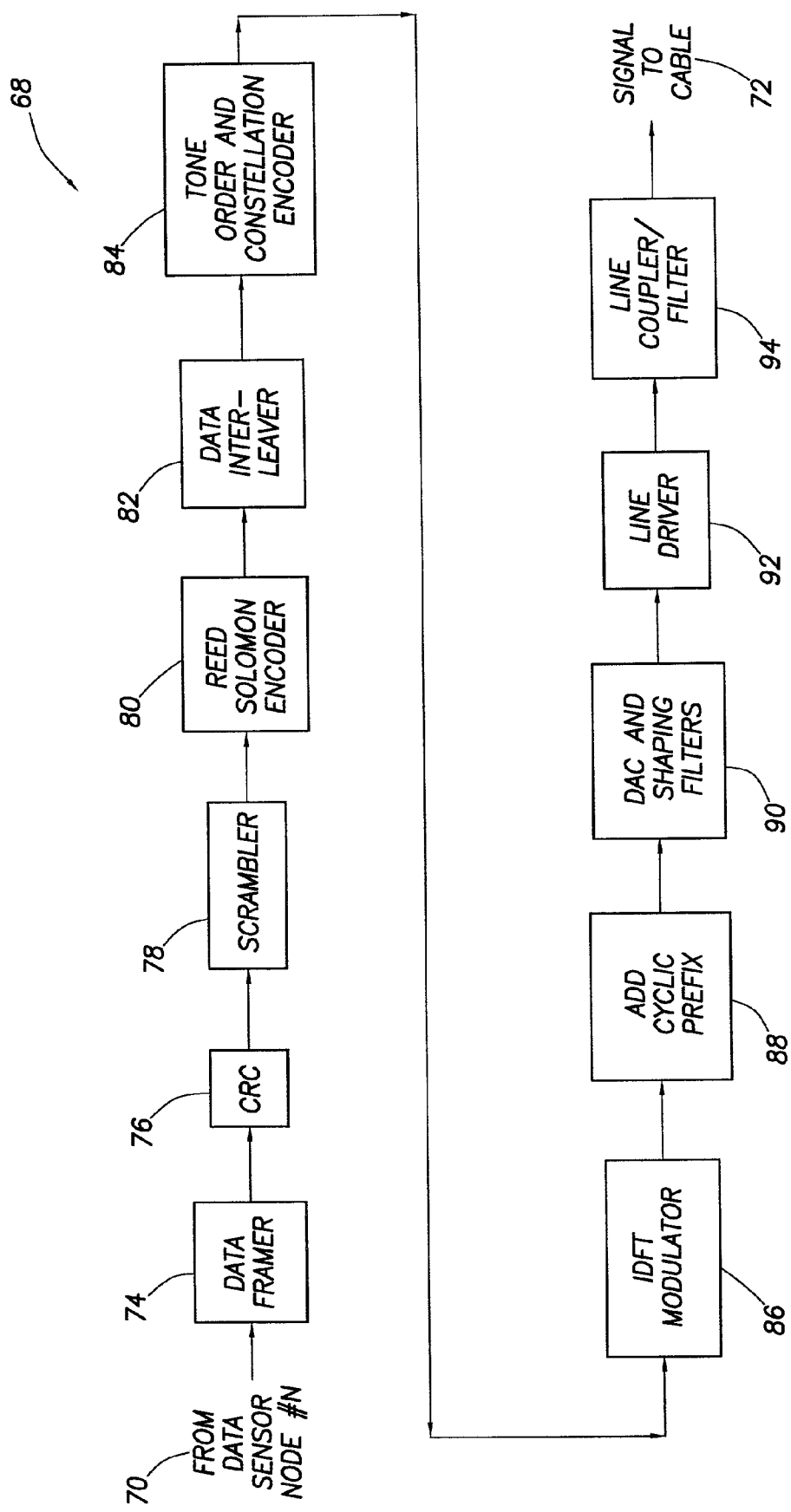
FIG. 5 is a schematic block diagram of an uplink transmitter of the MPP VDSL telemetry system.

Referring additionally now to FIG. 5, a schematic block diagram of an uplink transmitter 68 of the telemetry system 10 is representatively illustrated. The uplink transmitter 68 may be used for any of the transmitters 36, 38, 40 of the system 10 depicted in FIG. 4. The transmitter 68 receives data 70 from a sensor or other data source (such as any of the sensors 42, 44, 46) and transmits the data as a signal 72 to the transmission line 34.

As depicted in FIG. 5, the transmitter 68 includes a data framer 74, a cyclic redundancy check (CRC) generator 76, a data scrambler 78, a Reed-Solomon encoder 80, a data interleaver 82, a tone order and constellation coder 84, an inverse discrete Fourier transform (IDFT) modulator 86, a cyclic prefix adder 88, a digital to analog converter (DAC) with shaping filters go, a line driver 92 and a coupler/filter 94 (i.e., the couplers 48 shown in FIG. 4).

Figure 6A:
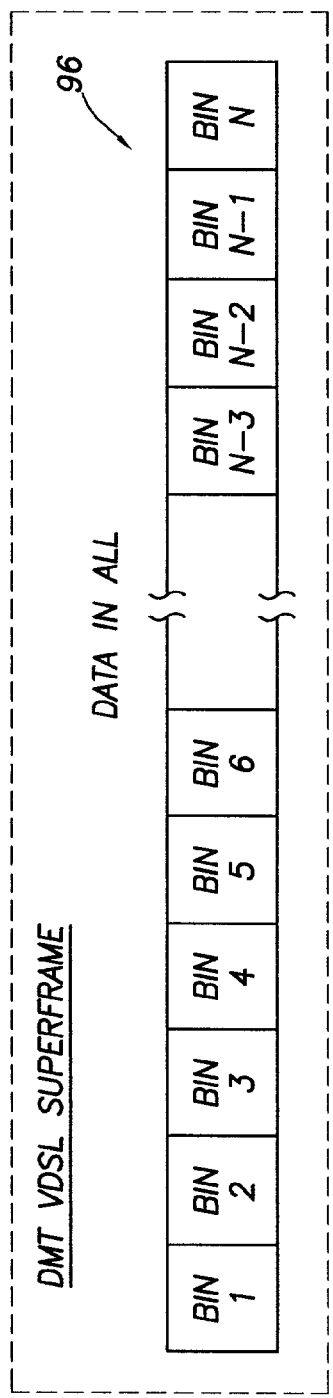
FIGS. 6A & B are a comparison of superframe formats between DMT VDSL and the MPP VDSL telemetry system of the present invention.

Referring additionally now to FIGS. 6A & B, a comparison of superframe formats between DMT VDSL and the MPP VDSL telemetry system 10 of the present invention is illustrated. A DMT VDSL data framer (not shown) arranges data into data frames and superframes as shown in FIG. 6A. Note that a DMT VDSL superframe 96 is entirely filled with data, so that the transmitter outputs signals in all the usable subchannel frequencies.

The data framer 74 of the MPP VDSL telemetry system 10, however, arranges the data into data frames and superframes, with data only in the portions of the superframes that correspond to the subchannels assigned to the particular transmitter. Zeros are inserted into the rest of the superframe locations corresponding to subchannels assigned to other transmitters.

Figure 6B:
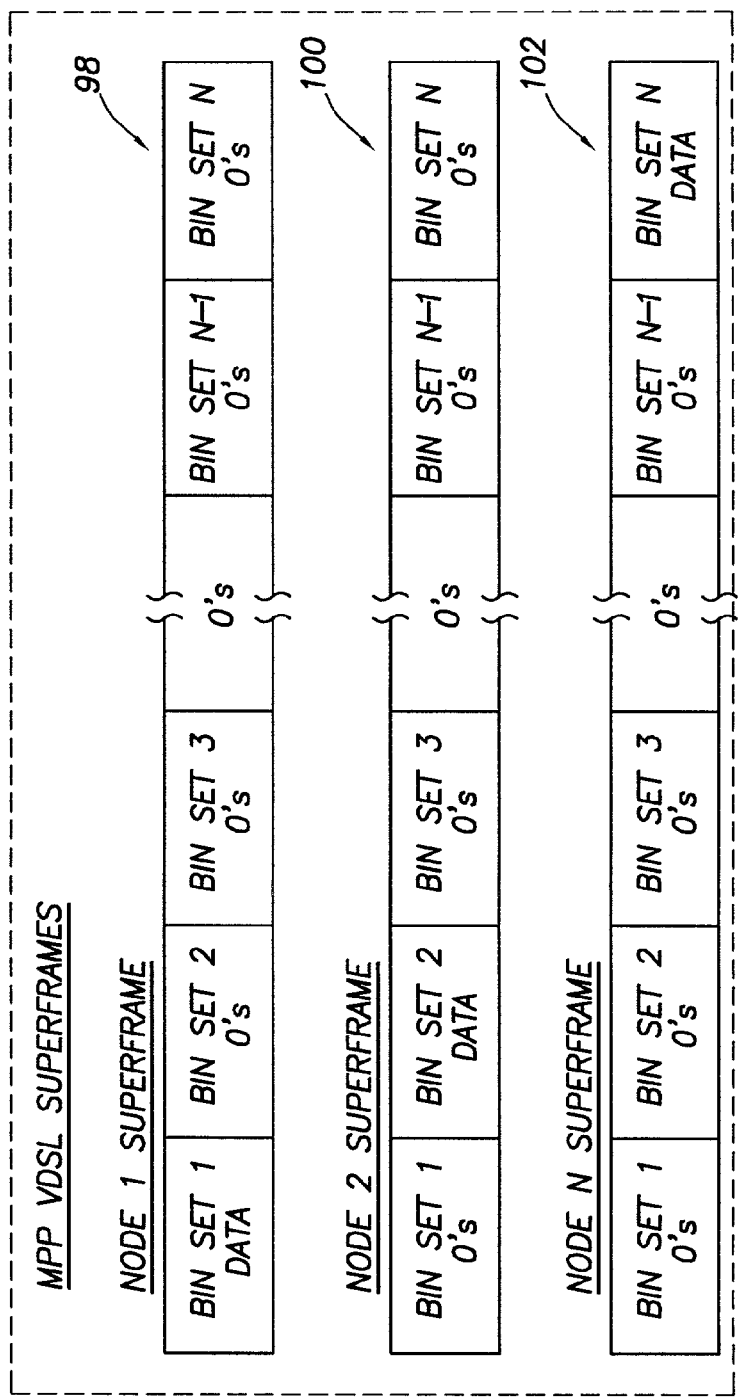

For example, FIG. 6B shows three superframes 98, 100, 102 for the respective transmitters 52, 54, 56 of FIG. 4. If the transmitter 52 is assigned a group of frequency subchannels depicted in FIG. 6B as bin set 1, then the superframe 98 arranged by the data framer 74 of the transmitter 52 will include data from the corresponding sensor 42 only in bin set 1. The remaining bin sets 2-n will not include any data. If the transmitter 54 is assigned a group of frequency subchannels depicted in FIG. 6B as bin set 2, then the superframe 100 arranged by the data framer 74 of the transmitter 54 will include data from the corresponding sensor 44 only in bin set 2. The remaining bin sets 1 and 3-n will not include any data. If the transmitter 56 is assigned a group of frequency subchannels depicted in FIG. 6B as bin set n, then the superframe 102 arranged by the data framer 74 of the transmitter 56 will include data from the corresponding sensor 46 only in bin set n. The remaining bin sets 1 through n−1 will not include any data.

The cyclic redundancy check generator 76 of the transmitter 68 keeps track of how many uncorrectable errors there were in a particular set of frames. A conventional DMT VDSL cyclic redundancy check generator adds a 6 bit byte to an entire superframe. In contrast, the cyclic redundancy check generator 76 of the transmitter 68 attaches an 8 bit byte only to the set of frames in the particular superframe that contains data associated with that transmitter. An entire MPP VDSL superframe (generated by the combination of all superframes of the individual downhole modems 36, 38, 40) will insert as many cyclic redundancy check bytes in the superframe as there are downhole nodes.

Figure 7A:
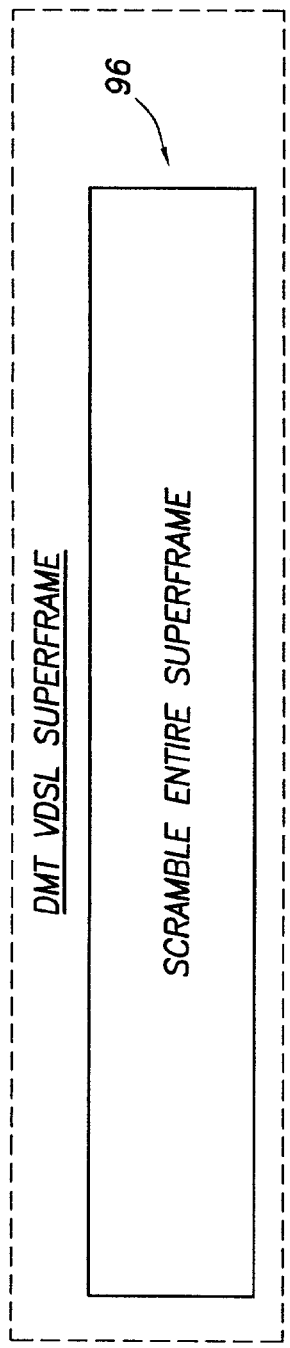
FIGS. 7A & B are a comparison of data scrambling formats between DMT VDSL and the MPP VDSL telemetry system of the present invention.
Figure 7B:
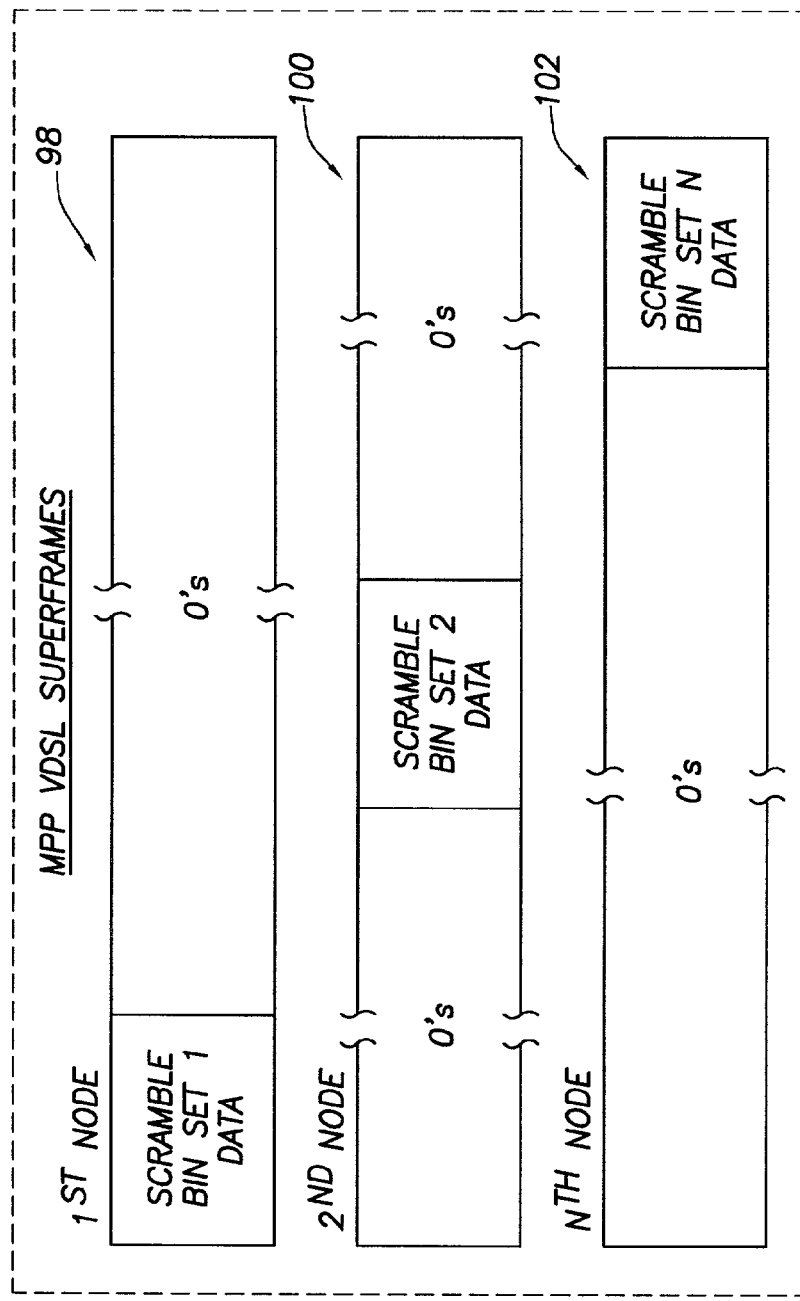

Referring additionally now to FIGS. 7A & B a comparison of data scrambling formats between DMT VDSL and the MPP VDSL telemetry system 10 of the present invention is representatively illustrated. A data scrambler reorders data bits according to a generator polynomial. Its purpose is to flatten the transmitted frequency spectrum independent of the actual data. In a conventional DMT-VDSL transmitter, the data is scrambled for an entire superframe, as depicted in FIG. 7A.

The data scrambler 78 of the MPP VDSL transmitter 68, however, scrambles only the portion of the superframe that contains data associated with that particular transmitter. Thus, in superframe 98 only the data in bin set 1 is scrambled, in superframe 100 only the data in bin set 2 is scrambled, and in superframe 102 only the data in bin set n is scrambled. If any of these superframes 98, 100, 102 were entirely scrambled (as is done for the superframe 96 of the DMT VDSL), then non-zero data would be inserted into bin sets associated with other transmitters, thus corrupting the data transmitted by the other transmitters.

Figure 8A:
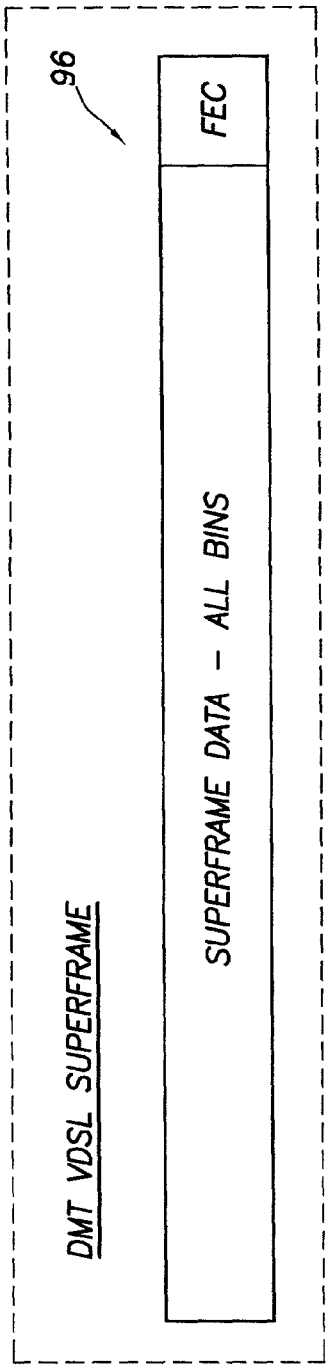
FIGS. 8A & B are a comparison of forward error correction formats between DMT VDSL and the MPP VDSL telemetry system of the present invention.
Figure 8B:
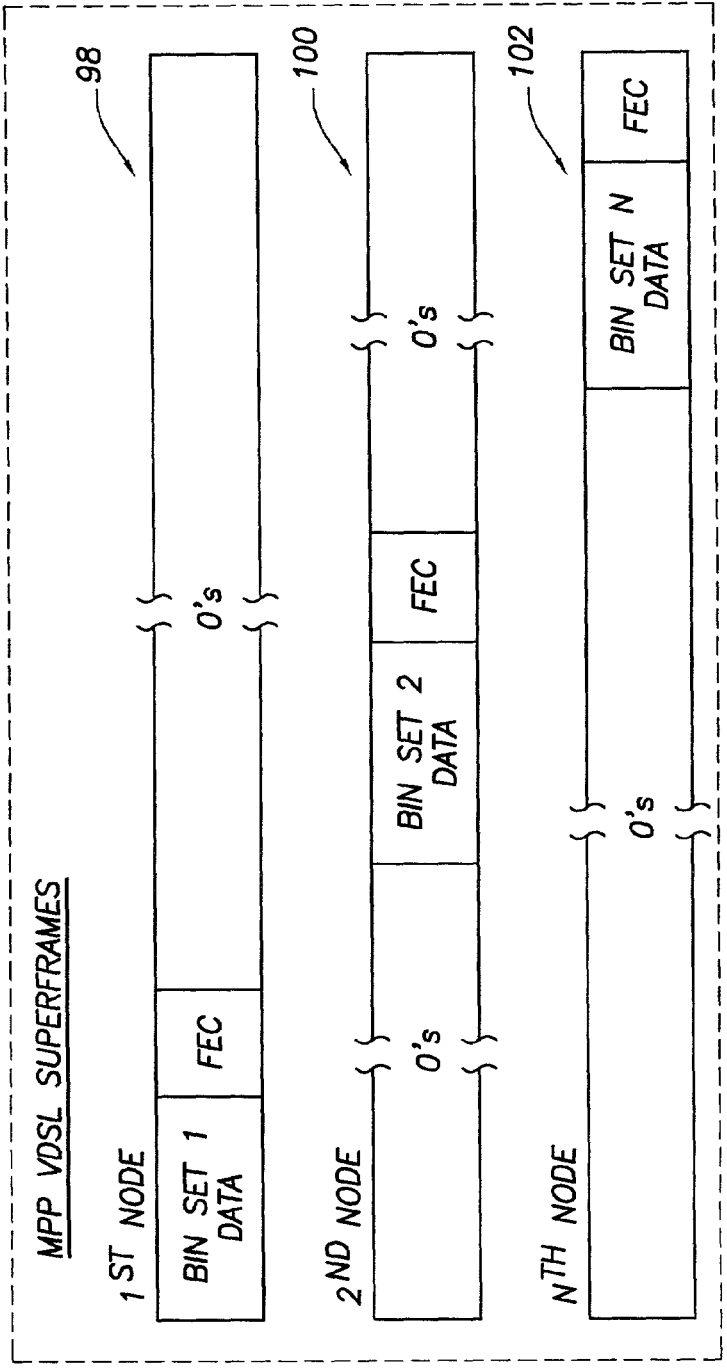

Referring additionally now to FIGS. 8A & B, a comparison of forward error correction formats between DMT VDSL and the MPP VDSL telemetry system 10 of the present invention is representatively illustrated. A Reed-Solomon encoder adds forward error correction (FEC) bits to a superframe. In a conventional DMT-VDSL transmitter, the FEC bits are assigned to the entire superframe 96.

In the MPP VDSL transmitter 68, however, the Reed-Solomon encoder 80 adds FEC bits only to the portion of the superframe associated with that particular transmitter. Thus, in superframe 98 FEC bits are added only to bin set 1, in superframe 100 FEC bits are added only to bin set 2, and in superframe 102 FEC bits are added only to bin set n. Accordingly, bandwidth efficiency of the MPP VDSL telemetry system 10 is somewhat reduced compared to DMT VDSL, because more FEC bits are transmitted.

The data interleaver 82 of the MPP VDSL transmitter 68 is similar in some respects to a data interleaver in a conventional DMT VDSL transmitter. The data interleaver 82 is convolutional and operates in conjunction with the Reed-Solomon encoder 80 to make it easier to correct sequences of errors occurring in bursts. In a conventional DMT VDSL transmitter, the data interleaver interleaves the data in the entire superframe 96. However, in the MPP VDSL transmitter 68, the data interleaver 82 only interleaves the data in the bin set associated with that particular transmitter. Thus, in superframe 98 only the data in bin set 1 is interleaved, in superframe 100 only the data in bin set 2 is interleaved, and in superframe 102 only the data in bin set n is interleaved.

The tone order and constellation encoder 84 of the MPP VDSL transmitter 68 assigns bins to the data and encodes the data. The number of bits per bin and the type of QAM coding to be performed were previously determined during modem initialization, as described below. For example, a subchannel that contains a high level of noise or is more attenuated will be assigned to carry less data bits than a less noisy or less attenuated subchannel. The output of the tone order and constellation encoder 84 is a number of parallel bit streams, where the number of bit streams is equal to the number of subchannels assigned to the transmitter 68.

After the data bits are assigned to each bin, QAM constellation encoding takes place using techniques known to those skilled in the art. The encoding technique that takes place is unique for each subchannel. The number of points in each subchannel's constellation depends on the number of bits assigned to the subchannel. For example, there may be from 2 to 15 bits per bin per data symbol. The QAM constellations may then be further encoded with a trellis encoder.

In a conventional DMT VDSL transmitter, data bits are assigned to all usable subchannels. However, in the MPP VDSL transmitter 68, bits are assigned only to those subchannels assigned to that particular transmitter during initialization.

Figure 9:
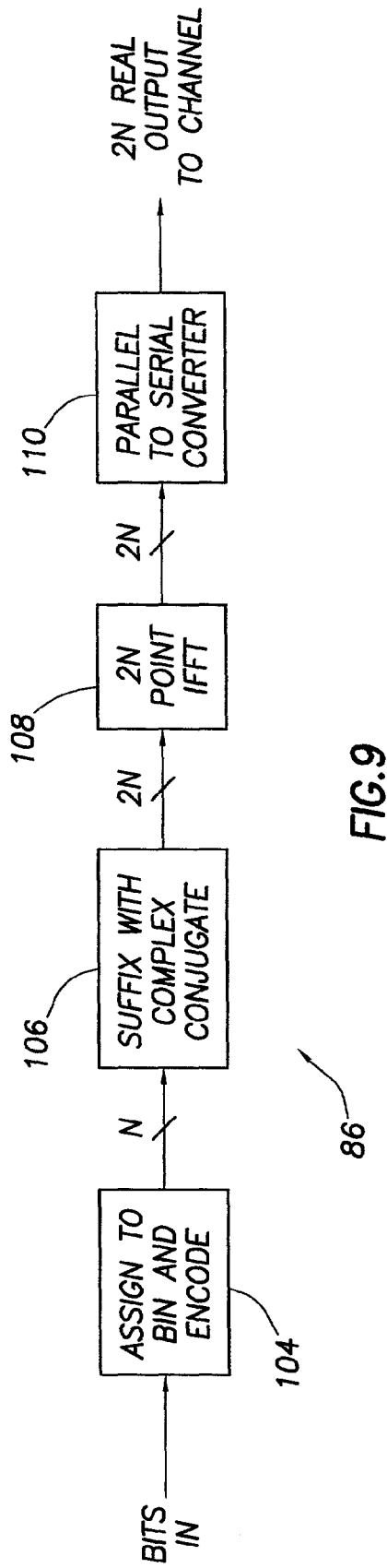
FIG. 9 is a schematic block diagram of a modulator of the MPP VDSL telemetry system of the present invention.

Referring additionally now to FIG. 9, a schematic block diagram of the IDFT modulator 86 of the MPP VDSL transmitter 68 is representatively illustrated. The IDFT modulator 86 converts the signal from the frequency domain to the time domain. The IDFT modulator 86 is of conventional design and is similar to that used in a conventional DMT VDSL transmitter.

A first step 104 is shown in FIG. 9 depicting an output of the tone order and constellation encoder 84 being input to the modulator 86. The "N" indication on the output of step 104 indicates that a number N of parallel bitstreams are input to the modulator 86.

A complex conjugate suffix is added to the N bitstreams in step 106. This results in 2N bitstreams. In step 108, an inverse fast Fourier transform is performed on each 2N points, thereby converting the data from the frequency domain to the time domain. In step 110, the 2N parallel bitstreams are converted into serial bitstreams.

Figure 10A:
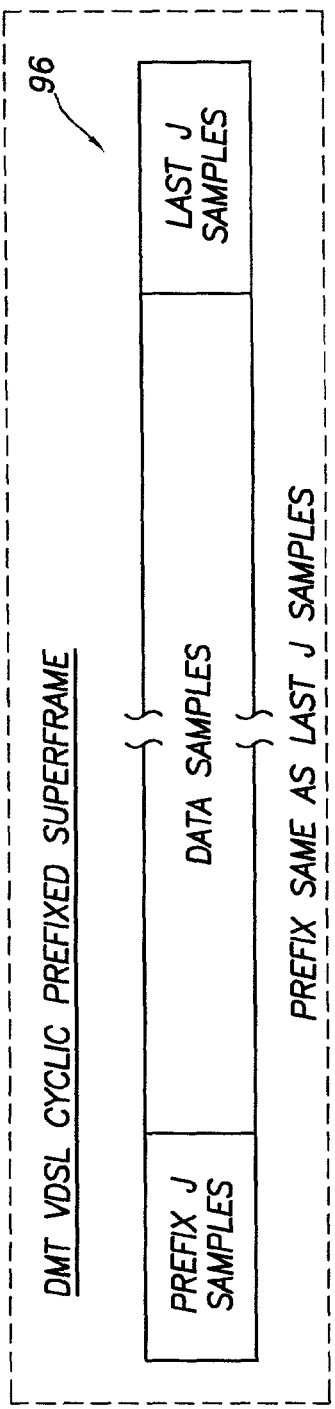
FIGS. 10A & B are a comparison of cyclic prefix formats between DMT VDSL and the MPP VDSL telemetry system of the present invention.

Referring additionally now to FIGS. 10A & B, a comparison of cyclic prefix formats between DMT VDSL and the MPP VDSL telemetry system 10 of the present invention is representatively illustrated. The cyclic prefix adder 88 of the MPP VDSL transmitter 68 adds a cyclic prefix in order to enable the frequency domain equalization that occurs in a receiver (such as the receiver 58 of the surface modem 32).

Figure 10B:
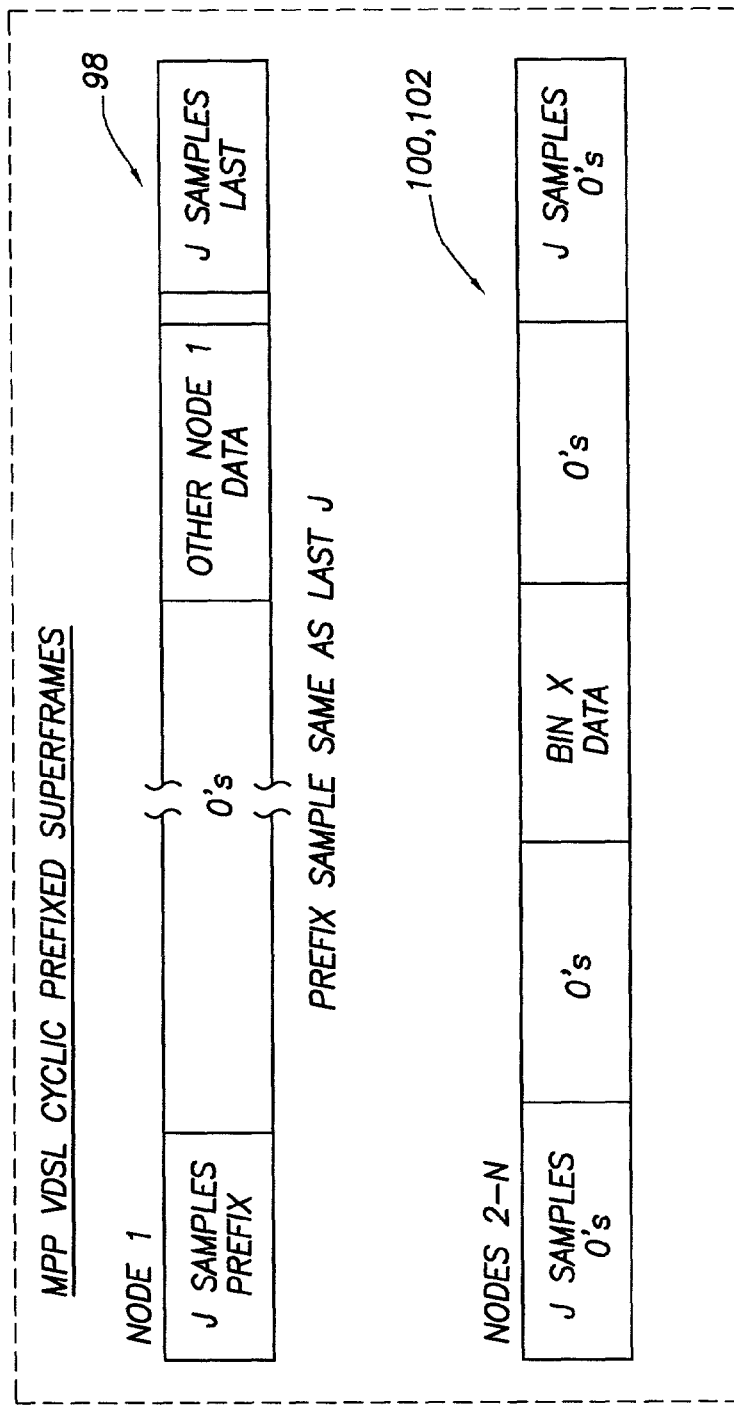

In a conventional DMT VDSL transmitter, a cyclic prefix is added to the entire superframe 96, as depicted in FIG. 10A. However, in the MPP VDSL telemetry system 10, multiple transmitters exist (such as transmitters 52, 54, 56), but only one transmitter can attach a cyclic prefix onto its associated superframe. The other transmitters insert zeros in place of a cyclic prefix, so that the lengths of the superframes generated by each of the transmitters is the same. Thus, in FIG. 10B, superframe 98 is depicted as having a cyclic prefix added thereto, but the other superframes 100, 102 have zeros in place of a cyclic prefix.

The digital to analog converter go of the MPP VDSL transmitter 68 converts the discrete output of the modulator 86 (with cyclic prefix added) into an analog signal so that it can be transmitted. Shaping filters smooth the signal and shape its spectral content. The converter go, driver 92 and coupler/filter 94 of the MPP VDSL transmitter 68 are conventional elements, whose operation is well understood by those skilled in the art.

Figure 11:
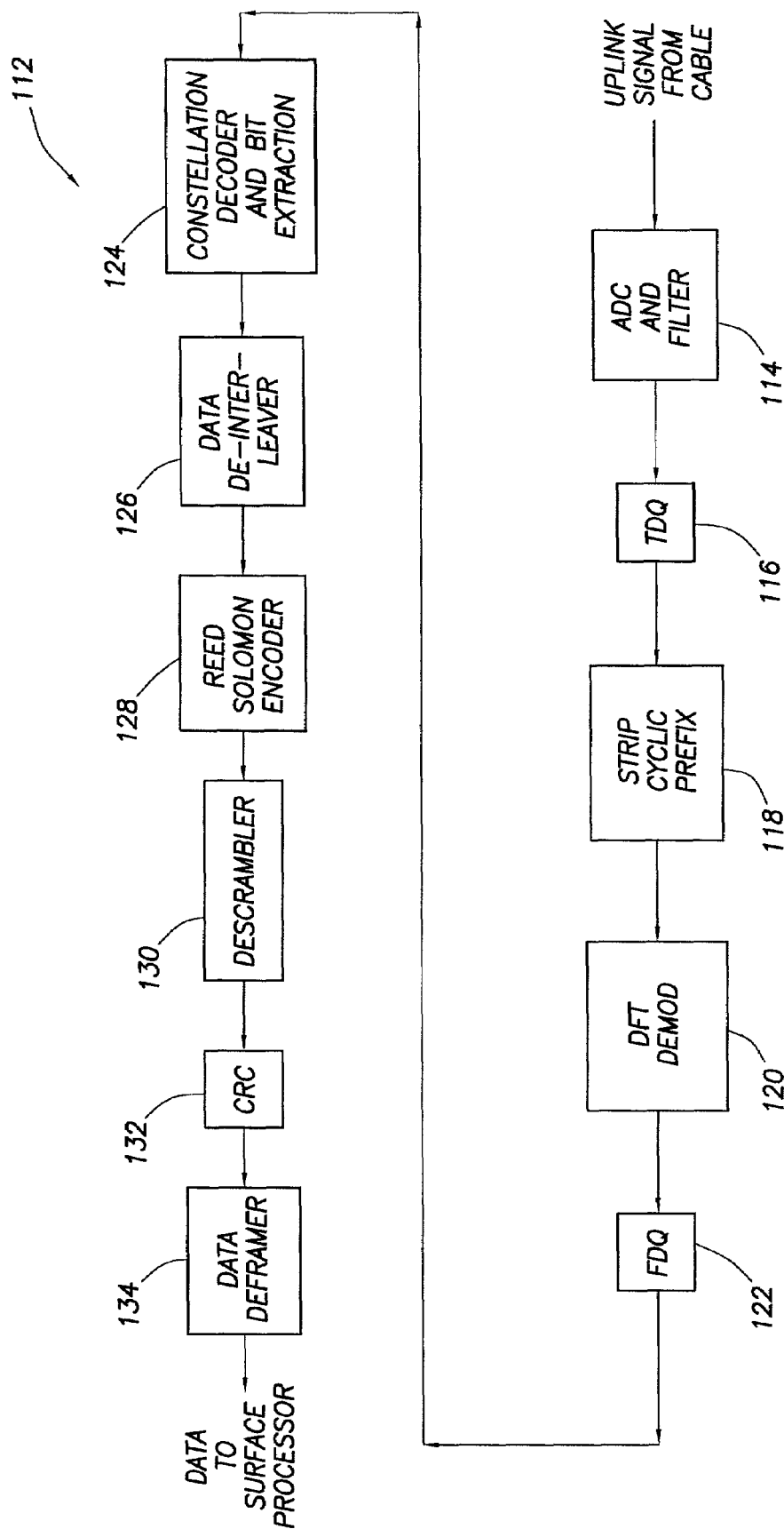
FIG. 11 is a schematic block diagram of a receiver of the MPP VDSL telemetry system of the present invention.

Referring additionally now to FIG. 11, a schematic block diagram of an uplink receiver 112 of the MPP VDSL telemetry system 10 of the present invention is representatively illustrated. The receiver 112 may be used for the receiver 58 of the modem 32 in the telemetry system 10. The receiver 112 includes a conventional input amplifier and auto gain control (not shown) for boosting the level of the incoming uplink signal, which is the summation of the signals transmitted by the multiple individual downhole transmitters. Thus, in receiving the signals transmitted by the downhole transmitters, the data superframes transmitted from the downhole modems are summed. The receiver 112 also includes an analog to digital converter (ADC) and filter 114, a time domain equalizer (TDQ) 116, a cyclic prefix stripper 118, a discrete Fourier transform (DFT) demodulator 120, a frequency domain equalizer (FDQ) 122, a constellation decoder and bit extractor 124, a de-interleaver 126, a Reed-Solomon decoder 128, a descrambler 130, a cyclic redundancy checker 132 and a data deframer 134.

The ADC and filter 114 samples the incoming signal and converts it from analog to digital form. In the MPP VDSL telemetry system 10, the sampling rate is approximately 44.16 Hz. This is approximately twice the frequency of the highest frequency subchannel of the upstream frequency band 24.

The time domain equalizer 116 shortens the period of intersymbol interference to less than the length of the cyclic prefix. The time domain equalizer 116 is conventional and is also used in a typical DMT VDSL receiver.

The cyclic prefix stripper 118 strips the cyclic prefix, which was added in the transmitters 68 (although only one of the transmitters added a non-zero cyclic prefix). The cyclic prefix stripper 118 is conventional and is also used in a typical DMT VDSL receiver.

Figure 12:
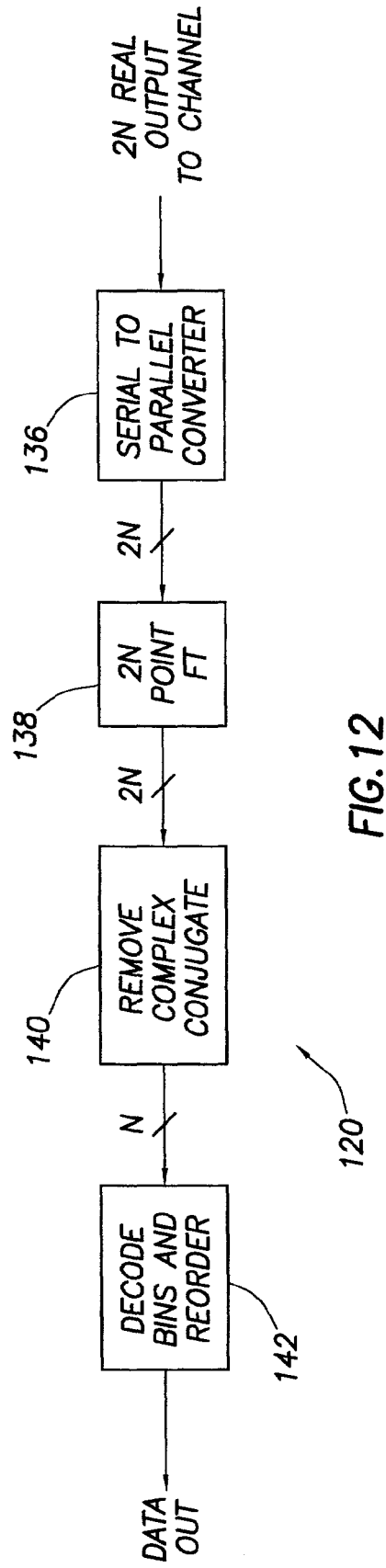
FIG. 12 is a schematic block diagram of a demodulator of the MPP VDSL telemetry system of the present invention.

Referring additionally now to FIG. 12, a schematic block diagram of the DFT demodulator 120 of the MPP VDSL receiver 112 is representatively illustrated. The steps performed in the demodulator 120 are basically the reverse of the steps performed in the modulator 86 of the transmitter 68. Using discrete Fourier transform, the signal is converted from the time domain back into the frequency domain.

The steps performed in the demodulator 120 are conversion from serial bitstream to parallel bitstream 136, 2N point discrete Fourier transform 138 (the inverse of the Fourier transform 108 performed in the modulator 86), removal of the complex conjugate suffix 140, and output of N parallel data bitstreams 142 to the constellation decoder and bit extractor 124. These steps are conventional and are performed in a typical DMT VDSL receiver.

Prior to input of the data bitstreams to the constellation decoder and bit extractor 124, the frequency domain equalizer 122 performs frequency domain equalization. The frequency domain equalizer 122 is conventional and is used in a typical DMT VDSL receiver.

After demodulation and equalization, the values for each subchannel are individually decoded using a conventional QAM constellation decoder and bit extractor 124. The decoder and bit extractor 124 is similar to that used in a typical DMT VDSL receiver.

The de-interleaver 126 basically reorders the output of the decoder and bit extractor 124 back into Reed-Solomon code words for processing by the Reed-Solomon decoder 128. In a DMT VDSL receiver, the de-interleaver operates on the entire superframe 96. However, in the MPP VDSL receiver 112, the interleaver 126 separately de-interleaves each of the groups of subchannels assigned to the individual transmitters 68.

The Reed-Solomon decoder 128 detects and corrects bit errors identified by the FEC bits added by the Reed-Solomon encoder 80 in the transmitter 68. A DMT VDSL receiver Reed-Solomon decoder operates on the entire superframe 96, while the MPP VDSL decoder 128 separately operates on each of the groups of subchannels assigned to the individual transmitters 68.

The descrambler 130 reverses the scrambling done by the scrambler 78 in the transmitter 68. In a DMT VDSL receiver, the descrambler operates on the entire superframe 96. However, the MPP VDSL descrambler 130 separately operates on each of the groups of subchannels assigned to the individual transmitters 68.

The cyclic redundancy checker 132 uses the cyclic redundancy check bytes generated by the CRC generator 76 in the transmitter 68 to keep track of how many superframes were received that contained an error uncorrectable by the FEC bits. A DMT VDSL cyclic redundancy checker checks the data in the entire superframe. However, the MPP VDSL checker 132 separately operates on each of the groups of subchannels assigned to the individual transmitters 68.

The data deframer 134 extracts the data from the frames of the superframes and buffers it in readiness for use following the receiver 112. For example, the deframer 134 may output the data to the computer system 66.

Figure 13:
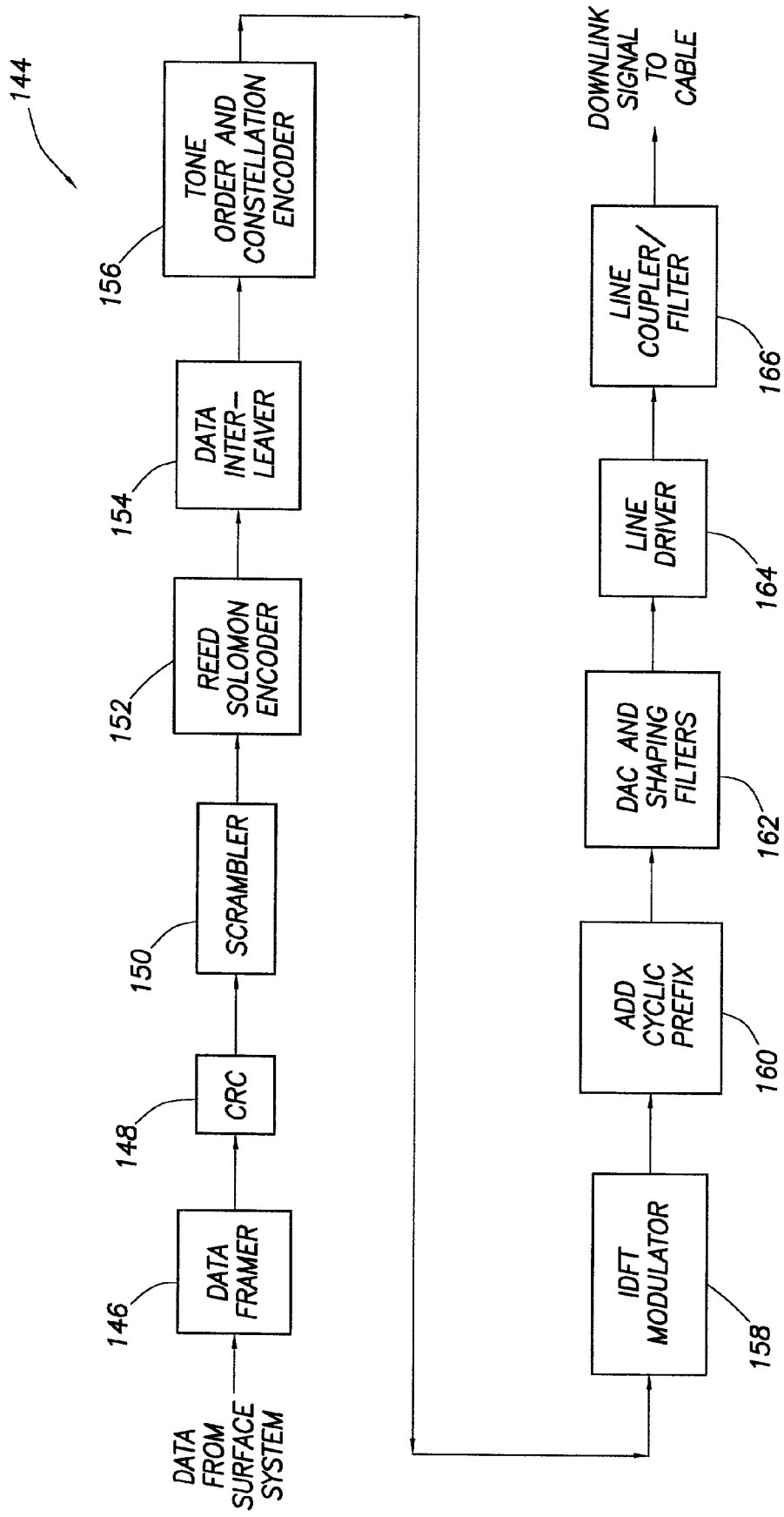
FIG. 13 is a schematic block diagram of a downlink transmitter of the MPP VDSL telemetry system of the present invention.

Referring additionally now to FIG. 13, a downlink transmitter 144 of the MPP VDSL telemetry system 10 of the present invention is representatively illustrated. The transmitter 144 may be used for the transmitter 50 of the surface modem 32.

The transmitter 144 includes a data framer 146, a cyclic redundancy check (CRC) generator 148, a data scrambler 150, a Reed-Solomon encoder 152, a data interleaver 154, a tone order and constellation coder 156, an inverse discrete Fourier transform (IDFT) modulator 158, a cyclic prefix adder 160, a digital to analog converter (DAC) with shaping filters 162, a line driver 164 and a coupler/filter 166 (i.e., the couplers 48 shown in FIG. 4).

The elements of the downlink transmitter 144 listed above are similar to those of the uplink transmitter 68 described above and are not described further herein. However, since the downlink transmitter 144 transmits to multiple receivers (such as receivers 60, 62, 64), node addressing accompanies any downlink command or data transfer directed to a particular node. Thus, the data framer 146 is modified to use a data format and protocol which includes addressing of multiple receivers.

Figure 14:
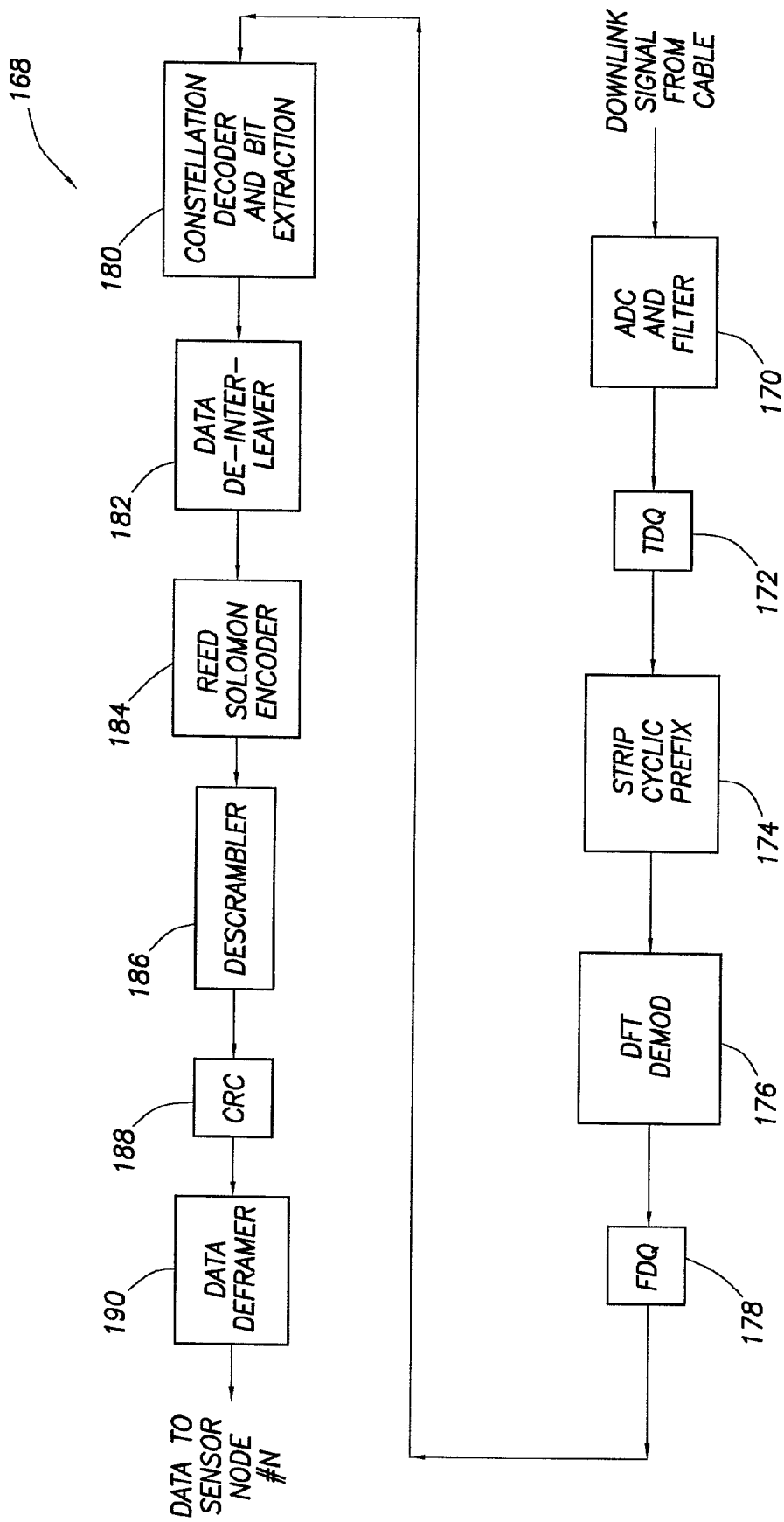
FIG. 14 is a schematic block diagram of a downlink receiver of the MPP VDSL telemetry system of the present invention.

Referring additionally now to FIG. 14, a downlink receiver 168 of the MPP VDSL telemetry system 10 of the present invention is representatively illustrated. The receiver 168 may be used for any of the downhole receivers 60, 62, 64.

The receiver 168 includes a conventional input amplifier and auto gain control (not shown) for boosting the level of the incoming downlink signal, an analog to digital converter (ADC) and filter 170, a time domain equalizer (TDQ) 172, a cyclic prefix stripper 174, a discrete Fourier transform (DFT) demodulator 176, a frequency domain equalizer (FDQ) 178, a constellation decoder and bit extractor 180, a de-interleaver 182, a Reed-Solomon decoder 184, a descrambler 186, a cyclic redundancy checker 188 and a data deframer 190.

The elements of the downlink receiver 168 listed above are similar to those of the uplink receiver 112 described above and are not described further herein. However, it is to be understood that each receiver 168 is configured according to the data format and protocol of the downlink transmitter 144, which includes addressing of the multiple receivers 168.

Note that the downlink transmissions can be greatly simplified by changing the transmissions to carrierless amplitude and phase modulation (CAP) technology. The signal processing involved with CAP transmitters and receivers is much simpler because CAP utilizes transmission of only one carrier frequency instead of the multiple carrier frequencies typically used with DMT VDSL and the MPP VDSL telemetry system 10 described herein. A CAP data frame in this application would include an address field to direct a downlinked command or data to the desired downhole node receiver. This alternate method is preferred for the permanent multiple wellbore sensor application, since downlink transmissions originate from only a single transmitter.

Figure 15:
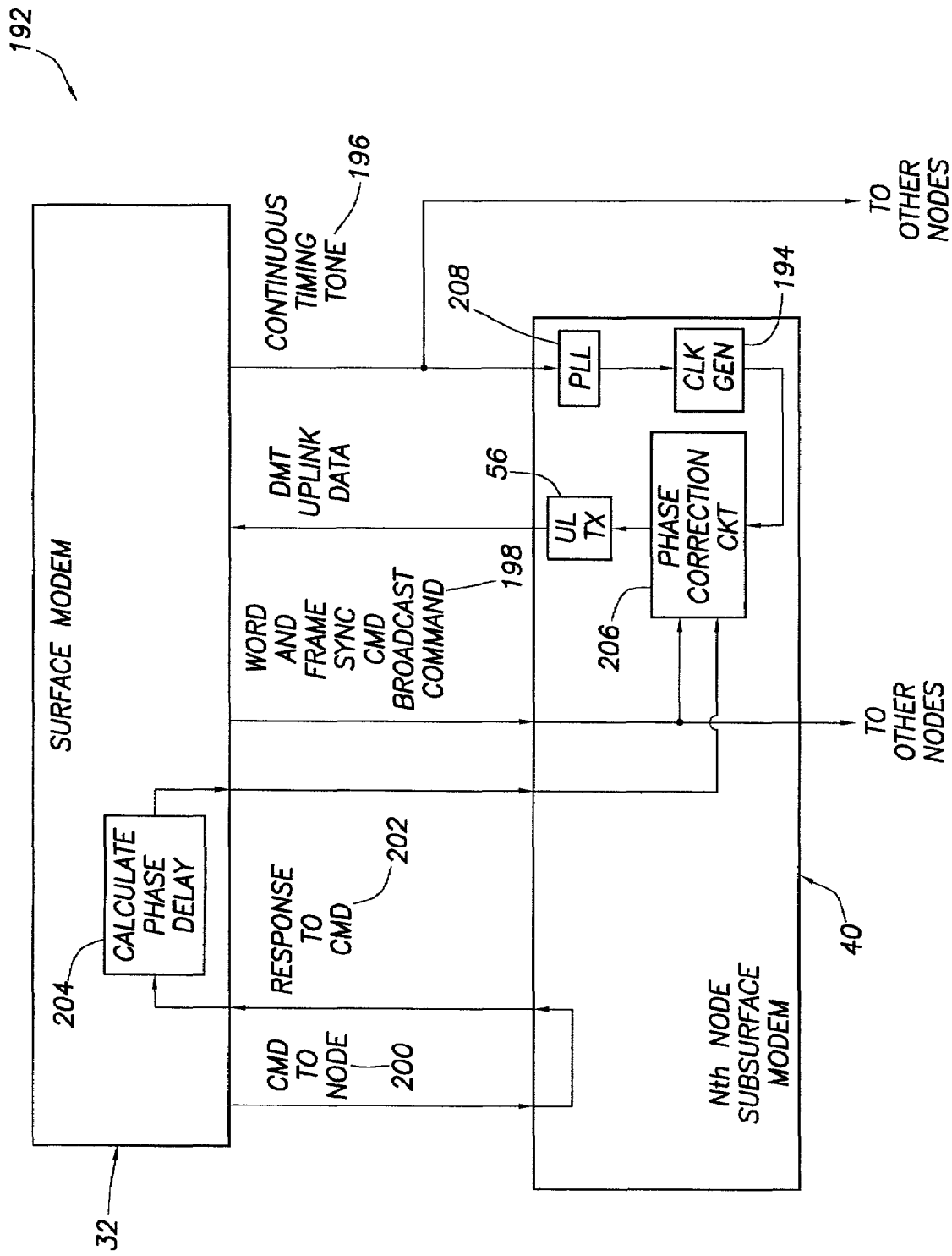
FIG. 15 is a schematic block diagram of a synchronization method used with the MPP VDSL telemetry system of the present invention.

Referring additionally now to FIG. 15, a synchronization method 192 embodying principles of the present invention is representatively and schematically illustrated. The method 192 may be used with the MPP VDSL telemetry system 10 of the present invention. However, it is to be clearly understood that the method 192 may be used with other telemetry systems, without departing from the principles of the invention.

The MPP VDSL telemetry system 10 uses synchronization of a clock circuit 194 in each of the individual subsurface nodes, so that the data (and tones) transmitted from the different subsurface transmitters 52, 54, 56 arrive synchronously at the surface receiver 58. The synchronization and timing is complicated by the fact that the individual nodes are at different depths (different distances from the receiver 58 along the transmission line 34).

A phase lock loop timing tone transmitted from the surface transmitter 50 will arrive at different times at the individual downhole nodes, because a different time will be required for the tone to travel from the transmitter 50 to each of the downhole nodes. Similarly, the time required for a transmission to reach the surface is different for each of the individual downhole nodes.

The method 192 as depicted in FIG. 15 solves these problems. For clarity of description, the method 192 is described herein in relation to synchronization of the downhole node corresponding to the sensor 46 and modem 40, but it will be readily appreciated by one skilled in the art that the method is performed for each of the downhole nodes.

The basic timing in a subsurface node is obtained by phase locking to a continuous tone 196 broadcast from the surface modem 32 to phase lock loop circuits 208 of all of the downhole nodes. The clock 194 in each node is derived from the phase locked tone 196 using techniques well known to those skilled in the art.

Data bit, word and frame synchronization is accomplished by resetting all of the node clocks 194 with a synchronization command 198 transmitted from the surface modem 32 to each of the downhole nodes. Thus, the clocks 194 of all of the downhole nodes are reset by the command 198.

However, correction of the phase of the node clocks 194 is accomplished individually. A separate command 200 is transmitted from the surface modem 32 to each downhole node and a response 202 is immediately transmitted from the node back to the surface modem. The delay between the command 200 transmission and receipt of the response 202 is calculated 204 for each downhole node, and this delay calculation is transmitted to a phase correction circuit 206 of that node. The circuit 206 corrects the node's clock 194 phase using the delay information.

Figure 16:
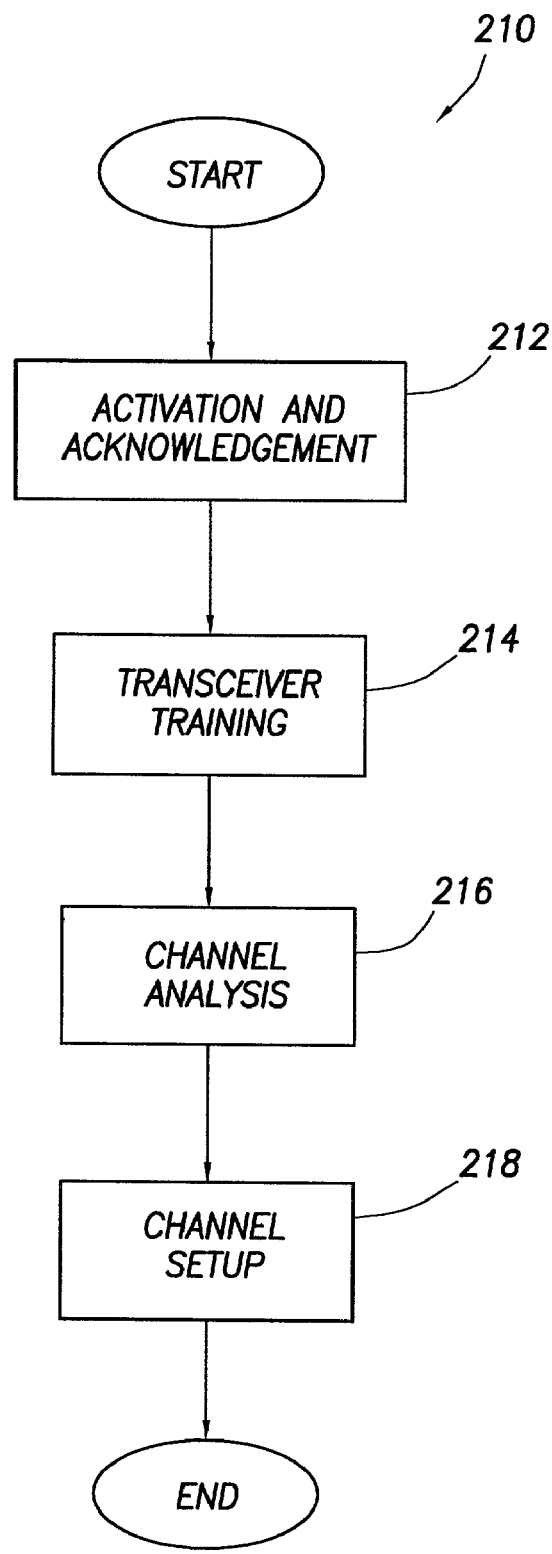
FIG. 16 is a flowchart for a method of initializing and training used with the MPP VDSL telemetry system of the present invention.

Referring additionally now to FIG. 16, a flowchart for a method 210 of initializing and training the MPP VDSL system 10 is representatively illustrated. The method 210 includes four general phases 212, 214, 216, 218.

The first phase 212 is activation and acknowledgement. During this phase 212, the modems 32, 36, 38, 40 on both ends of the transmission line 34 are turned on and perform an initial handshake. The signals transmitted during this phase 212 are single tones at one of the subchannel frequencies. As described above, the downhole modems 36, 38, 40 use phase locked loops 208 to lock their clock circuits 194 to the timing tone 196 generated by the surface modem 32.

This phase 212 differs from standard DMT VDSL activation and acknowledgement, in that individual downhole modems 36, 38, 40 addresses and relative locations are established. The locations of the downhole modems 36, 38, 40 relative to the surface modem 32 are determined as described above for the method 192. The addresses of the individual downhole modems 36, 38, 40 may be either set beforehand, or they may be assigned during this phase 212.

The second phase 214 is transceiver training. During this phase 214, several wideband signals are sent between the modems 32, 36, 38, 40. The wideband signals allow each modem to calculate the upstream and downstream received power spectral density and to adjust an automatic gain control at each receiver 58, 60, 62, 64 prior to analog-to-digital conversion 114, 170. The wideband signals are also used to train the equalizers 116, 122, 172, 178 in each receiver 58, 60, 62, 64. Unlike conventional DMT VDSL systems, separate training must be performed between the surface modem 32 and each of the downhole modems 36, 38, 40.

The third phase 216 is channel analysis. During this phase 216, options, capabilities and configuration information is exchanged between the surface modem 32 and each of the individual downhole modems 36, 38, 40.

The fourth phase 218 is channel setup. In this phase 218, the modems 32, 36, 38, 40 determine which uplink and downlink options transmitted in the previous phase 216 will be used. The downhole modems 36, 38, 40 transmit information to the surface modem 32, which allows the surface modem to determine how to configure the downhole modem transmitters 52, 54, 56.

The surface modem 32 determines which subchannels each downhole transmitter will use and how many bits will be transmitted in each subchannel. The subchannels are preferably distributed to the downhole transmitters 52, 54, 56 such that the subchannels are contiguous in frequency for each transmitter. The lowest available frequency subchannels are assigned to each transmitter, and a sufficient quantity of the subchannels are assigned to each transmitter, so that the data rate transmission requirements for that node are satisfied.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A telemetry system for use in a wellbore, the telemetry system comprising:

multiple nodes positioned in the wellbore and distributed over a substantial length of the wellbore;

the multiple nodes simultaneously communicating with a remote location via a single transmission channel at a combined data transmission rate of greater than 300 kbps; and a receiver at the remote location receiving data transmitted from each node in a respective superframe.

2. The telemetry system according to claim 1, wherein a usable bandwidth for transmitting from the remote location to the nodes is less than a usable bandwidth for transmitting from the nodes to the remote location.

3. The telemetry system according to claim 1, wherein transmissions from the nodes arrive synchronously at the remote location.

4. The telemetry system according to claim 1, wherein the receiver includes a de-interleaver which separately de-interleaves data transmitted from each of the nodes in a portion of the respective superframe associated with the respective node.

5. The telemetry system according to claim 1, wherein the receiver includes a decoder which separately detects and corrects bit errors identified by forward error correction bits from each of the nodes in a portion of the respective superframe associated with the respective node.

6. The telemetry system according to claim 1, wherein the receiver includes a descrambler which separately descrambles data from each of the nodes in a portion of the respective superframe associated with the respective node.

7. The telemetry system according to claim 1, wherein the receiver includes a cyclic redundancy checker which separately checks data from each of the nodes in a portion of the respective superframe associated with the respective node.

8. The telemetry system according to claim 1, wherein each of the nodes includes a modem for communication with a modem at the remote location.

9. The telemetry system according to claim 8, wherein each of the node modems and the remote location modem include a transmitter and a receiver.

10. The telemetry system according to claim 1, wherein each of the nodes includes at least one sensor.

11. The telemetry system according to claim 10, wherein the sensor is a geophone.

12. The telemetry system according to claim 1, further comprising a transmitter at the remote location for transmitting to the nodes, the transmitter adding an address to a transmission which is directed to any single node, each node having a unique address.

13. The telemetry system according to claim 12, wherein each node includes a receiver which responds to the unique address of the respective node.

14. The telemetry system according to claim 1, wherein each of the nodes includes a transmitter which transmits data to the remote location using a set of frequency subchannels, each node transmitter using a unique set of subchannels.

15. The telemetry system according to claim 14, wherein each node transmitter includes a data framer which inserts data in the respective superframe only in portions of the respective superframe corresponding to the set of subchannels used by the respective node transmitter.

16. The telemetry system according to claim 14, wherein each node transmitter includes a cyclic redundancy check generator which attaches a byte only to a portion of the respective superframe corresponding to the set of subchannels used by the respective node transmitter.

17. The telemetry system according to claim 14, wherein each node transmitter includes a data scrambler which scrambles data only in a portion of the respective superframe corresponding to the set of subchannels used by the respective node transmitter.

18. The telemetry system according to claim 14, wherein each node transmitter includes an encoder which adds forward error correction bits only to a portion of the respective superframe corresponding to the set of subchannels used by the respective node transmitter.

19. The telemetry system according to claim 14, wherein each node transmitter includes a data interleaver which interleaves data only in a portion of the respective superframe corresponding to the set of subchannels used by the respective node transmitter.

20. The telemetry system according to claim 14, wherein each node transmitter includes a QAM constellation encoder which encodes data only in a portion of the respective superframe corresponding to the set of subchannels used by the respective node transmitter.

21. The telemetry system according to claim 14, wherein each node transmitter includes a cyclic prefix adder, but only one of the cyclic prefix adders adds a cyclic prefix to the respective superframe generated by the respective transmitter.

22. A method of communicating data in a wellbore, the method comprising the steps of:
 installing multiple downhole modems in the wellbore;
 installing a remote modem at a location remote from the downhole modems; and
 simultaneously communicating data from each of the downhole modems to the remote modem, each downhole modem communicating with the remote modem using at least one frequency subchannel separate from frequency subchannels used by the other downhole modems, the data communicating step including transmitting a data superframe from each of the downhole modems to the remote modem.

23. The method according to claim 22, wherein in the superframes transmitting step, a data framer of each of the downhole modems inserts data only in a portion of the superframe corresponding to the at least one subchannel used by the respective downhole modem.

24. The method according to claim 22, wherein the superframes transmitting step further comprises attaching a cyclic redundancy check generator byte in each of the downhole modems only to a portion of the corresponding superframe which contains data associated with the respective downhole modem.

25. The method according to claim 22, wherein the superframes transmitting step further comprises scrambling in each of the downhole modems data only in a portion of the superframe corresponding to the at least one subchannel used by the respective downhole modem.

26. The method according to claim 22, wherein the superframes transmitting step further comprises adding forward error correction bits in each of the downhole modems only to a portion of the corresponding superframe which contains data associated with the respective downhole modem.

27. The method according to claim 22, wherein the superframes transmitting step further comprises interleaving data in each of the downhole modems only in a portion of the corresponding superframe which contains data associated with the respective downhole modem.

28. The method according to claim 22, wherein the superframes transmitting step further comprises QAM constellation encoding data in each of the downhole modems only in a portion of the corresponding superframe which contains data associated with the respective downhole modem.

29. The method according to claim 22, wherein the superframes transmitting step further comprises adding a cyclic prefix in only one of the downhole modems to the corresponding superframe.

30. The method according to claim 22, further comprising the steps of broadcasting wideband signals between the remote and downhole modems, calculating upstream and downstream received power spectral density for each modem, adjusting an automatic gain control for each modem, and training at least one equalizer of each modem.

31. The method according to claim 22, further comprising the step of exchanging channel capability and configuration information between the remote modem and each of the downhole modems.

32. The method according to claim 22, further comprising the step of establishing a unique address for each of the downhole modems.

33. The method according to claim 32, wherein the establishing step is performed after installing the downhole modems in the wellbore.

34. The method according to claim 22, further comprising the step of determining the at least one subchannel for each downhole modem.

35. The method according to claim 34, wherein the determining step is performed by the remote modem.

36. The method according to claim 22, wherein the data communicating step further comprises transmitting data from the downhole modems to the remote modem, the data arriving synchronously at the remote modem.

37. The method according to claim 36, wherein the data transmitting step further comprises calculating a transmission delay between the remote modem and each of the downhole modems and delaying a clock circuit of each downhole modem based on the calculated transmission delay for the respective downhole modem.

38. The method according to claim 37, further comprising the step of phase locking each of the downhole modem clock circuits to a tone broadcast from the remote modem to each of the downhole modems.

39. The method according to claim 22, further comprising the step of determining a bit rate capacity of each of the subchannels.

40. The method according to claim 39, wherein in the bit rate capacity determining step, some of the subchannels have less bit rate capacity than others of the subchannels.

41. The method according to claim 39, further comprising the step of assigning the subchannels to the respective downhole modems.

42. The method according to claim 41, wherein the subchannels assigning step includes assigning the subchannels to the respective downhole modems so that the subchannels assigned to each downhole modem have a combined bit rate capacity which is greater than or equal to a bit rate requirement for the respective downhole modem.

43. The method according to claim 41, wherein the subchannels assigning step is performed after the downhole modems are installed in the wellbore.

44. The method according to claim 22, wherein the data communicating step further comprises receiving the data superframes from the downhole modems at the remote modem.

45. The method according to claim 44, wherein the receiving step further comprises summing the data superframes transmitted from the downhole modems.

46. The method according to claim 44, wherein the receiving step further comprises separately de-interleaving for each downhole modem the at least one subchannel used by the respective downhole modem.

47. The method according to claim 44, wherein the receiving step further comprises separately detecting and correcting bit errors in the at least one subchannel used by each respective downhole modem.

48. The method according to claim 44, wherein the receiving step further comprises separately descrambling the at least one subchannel used by each respective downhole modem.

49. The method according to claim 44, wherein the receiving step further comprises using a cyclic redundancy checker to separately check data in the at least one subchannel used by each respective downhole modem.

* * * * *